United States Patent Office 3,183,077
Patented May 11, 1965

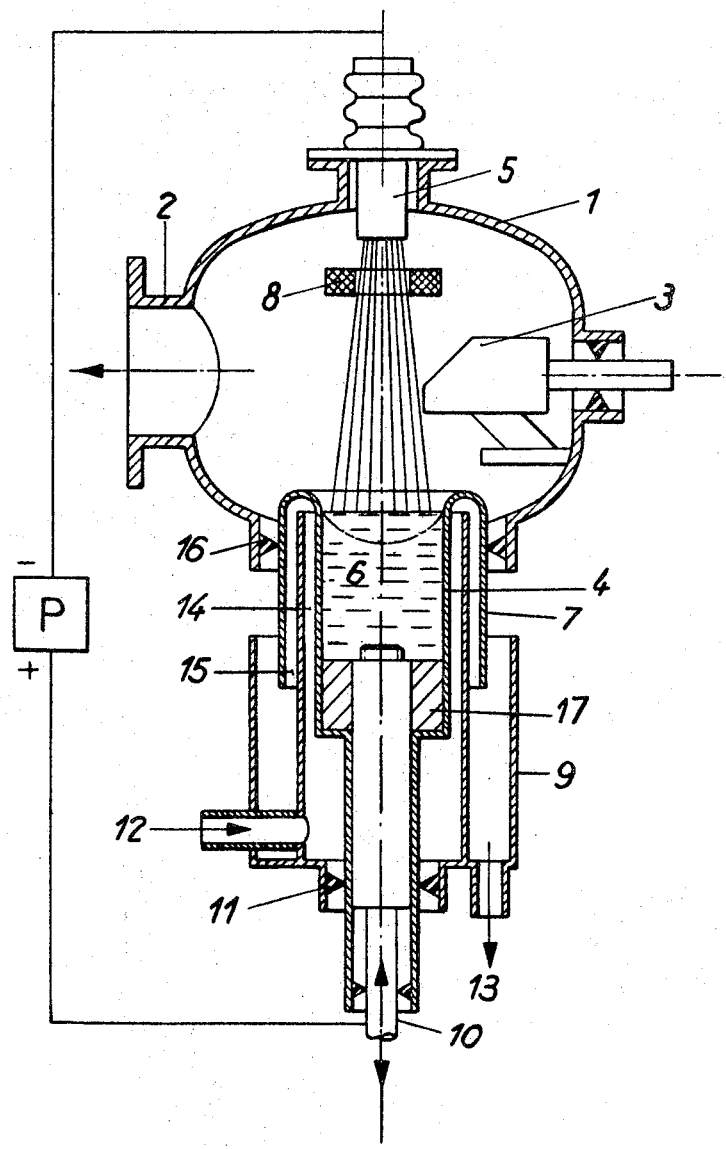

3,183,077
PROCESS FOR VACUUM DEGASSING
Thaddäus Kraus, Vaduz, Liechtenstein, assignor, by mesne assignments, to Bendix-Balzers Vacuum, Inc., Wilmington, Del., a corporation of Delaware
Filed Jan. 30, 1962, Ser. No. 169,967
5 Claims. (Cl. 75—10)

The present invention relates to the degassing in vacuo of melts which are heated by a beam of electrically charged particles e.g. electron- or ion-beams.

In all vacuum degasisng methods it is important that as far as possible all parts of a melt contained in a crucible get to the surface of the melt in succession in order to give off there the dissolved gases to the vacuum. For this purpose it is known to stir and mix thoroughly the melt, using mechanical stirring devices, quickly rotating crucibles, blowing a neutral gas through the melt, or by inductive stirring by means of coils arranged outside the crucible and energised by alternating current. With electron- and ion-beam furnaces there exists likewise the problem of stirring and thoroughly mixing the melt.

The present invention has the principal object of stirring and thoroughly mixing the melt in vacuo while dispensing with the aforesaid stirring devices or means.

It is another object of the invention to keep the melt hot while degassing the same without requiring any substantial additional means.

With these and other objects in view which will become apparent later from this specification and the accompanying drawing, I provide a method for the degassing of melts in vacuo comprising the steps of exposing at least part of the free surface of a melt to a beam of electrically charged particles in a manner varying at a frequency not exceeding one cycle per second, producing thermal convection in the melt by alternately heating and cooling its surface and so successively bringing the whole melt to the free surface in direct contact with the vacuum.

In one embodiment of the invention said beam is directed constantly at the same spot of said surface with an intensity varying at said frequency.

In another embodiment said beam is directed at constant intensity at a spot of said surface whose position on said surface is periodically varied at said frequency.

In yet another embodiment the surface of said melt is stationary and said beam is moved so as to scan at said frequency the stationary surface of said melt. For example said beam is rotated at said frequency over a stationary surface of said melt.

In still another embodiment said beam is stationarily directed on a spot eccentrically positioned on the surface of said melt which is rotated at said frequency.

The electrically charged particles of the beam may be eletcrons or ions. If a solid charge is treated, it is preferably melted down by the same beam as subsequently used for degassing the melt and for keeping it hot.

In order to mix the melt in the crucible constantly and homogeneously, the electron gun is for example operated discontinuously in such a manner that the heating of the free surface of the melt is effected pulsating at a frequency of for example 20 pulses per minute. In the intervals between two heating pulses the surface of the melt bath radiates off heat and so consequently cools down slightly, to be heated up again by the subsequent heat impulse. By this continued alternating heating up and cooling down convection currents are formed under the surface of the melt bath which entail a continuous uniform and thorough mixing.

The method described has the advantage that the intensity of the stirring action and the amount of heat supplied may be accurately controlled at the same time. The total heat energy supplied for the purpose of keeping the melt hot depends on the length of time of keeping the electron beam switched on and on the intensity thereof, while the intensity of the stirring action depends moreover on the frequency of the heating impulses.

The switching on and off of the electron beam is effected conveniently by an automatic device of conventional type containing at the same time also the device for supplying the electron gun with energy.

The method according to the invention may even be carried out in a modified way. It is not necessary to heat the entire surface of the melt bath simultaneously by the electron beam. Alternatively one may proceed so that the electron- or ion-beam may be kept switched on permanently, but is concentrated by means of a conventional electron- or ion-optical control device, e.g. by means of deflector coils, successively on the various parts of the surface of the melt bath. The part of the surface actually hit by the beam is heated up, while those parts cool off, which are just not being hit by the beam. Each part of the surface is accordingly subject by the beam periodically impinging on it to a pulsating heating and cooling, which results in the desired thorough mixing of the melt. The simplest way consists in guiding the beam uniformly circling over the surface of the melt bath. When the method is carried out in the manner described last, the device for automatically periodically switching on and off the electron gun may be dispensed with.

In yet a different way the pulsating heating and cooling of the various parts of the surface of the melt may be effected in that a non-pulsating electron beam is kept stationarily on an eccentric spot of the surface of the melt bath, while the crucible containing the melt slowly rotates.

By this last described method the same stirring effect is attained as described hereinabove for the other embodiments of carrying out the invention in which the surface of the melt bath is stationary and the electron beam or ion beam is moved. It should however be pointed out that the stirring action is not effected by the slow uniform rotation of the crucible. The latter would per se merely produce a uniform rotary motion of the surface of the melt bath without any stirring action.

A device according to the present invention for the degassing of a melt comprises in combination: a vacuum chamber, a crucible in operation containing the melt to be degassed arranged in said vacuum chamber, a source of electrical energy directing in operation a beam of electrically charged particles on at least part of the free surface of said melt, and means for varying the impact of said beam on said surface at a frequency not exceeding one cycle per second.

These and other features of my invention will be clearly understood from the following description thereof given with reference to the accompanying drawing illustrating by way of example a device according to the invention diagrammatically shown in a longitudinal section.

A casing 1 has a port 2 connected to a vacuum pump, a charging device 3 for the material to be treated, a crucible 4 containing the melt 6 and an electron gun 5 arranged on top of the casing 1 and directing its beam through a deflector coil 8 on to the free surface of the melt. The crucible 4 has an upturned cylindrical flange 7 which is sealed against the casing 1 by a vacuum seal 16 allowing rotational relative motion. The crucible 4 is mounted on a shaft 10 by means of which it can be kept in rotation.

The shaft 10 and electron gun 5 are connected to the positive and negative pole, respectively, of a diagrammatically indicated source of electric energy P containing an automatic device periodically switching on and off the supply of energy. Such devices are known in themselves and are accordingly not shown in detail.

The lower part of the crucible is surrounded by a stationary open vessel 9 having an inner sleeve 14 extending into the annular space 15 between the crucible 4 and its upturned cylindrical flange 7. A coolant is introduced into the inner sleeve 14 through a port 12, rises between said sleeve 14 and the crucible 4, cooling the latter, and flows over the rim of said sleeve 14 and between the latter and the cylindrical flange 7 into the vessel 9, from where it is drained at 13. The lower part of the rotatable crucible 4 is sealed against the vessel 9 by a seal 9 allowing relative rotational motion.

In operation, the metal to be degassed is introduced into the crucible 4 by means of the device 3 either in the solid state or already in the molten state. If it is introduced in the solid state it is firstly molten down by the electron beam projected from the gun 5, the source of energy P being in this case switched on continuously.

In any case the electron beam from the gun 5 is directed on to the free surface of the melt 6 contained in the crucible.

The pulsations at a frequency below 1 cycle per second, say 20 pulses per minute may be produced by the source of energy P being periodically switched on and off. In this case the spot at which the electron beam impinges on the surface of the melt 6 need not be varied.

Alternatively the source P may be kept switched on, and the electron beam may be controlled by the deflector coil 8 in such a manner as to scan the free surface of the melt or to circle over it.

In both cases mentioned hereinabove the crucible 4 is kept stationary. However the crucible may be rotated at a speed not exceeding one revolution per second by means of the shaft 10, and the electron beam may be directed eccentrically to the axis of rotation, so that the spot at which it impinges the free surface of the melt 6 varies, as the crucible 4 rotates. The electron beam need not in this case be periodically switched on and off, but some or all of the methods described may be combined if desired.

The shaft 10 is movable up and down as indicated by the double arrow in order to keep the surface of the melt on a constant level by lowering the bottom 17 of the crucible while its content increased by more material being added to it by the charging device 3.

When the crucible 4 is rotated in operation the free surface of the melt 6, which in the state of rest is substantially plane, assumes the shape of a paraboloid as indicated by a chain dotted line.

While I have herein described and illustrated in the accompanying drawing what may be considered typical and particularly useful embodiments of my said invention, I wish it to be understood that I do not limit myself to the particular details and dimensions described or illustrated; for obvious modifications will occur to the person skilled in the art.

What I claim as my invention and desire to secure by Letters Patent, is:

1. A method for the degassing of melts comprising:
the step of directing a beam of electrically charged particles upon at least part of the free surface of a melt,
the step of pulsing said beam at a frequency not exceeding one cycle per second whereby the surface of said melt is alternately heated and cooled thereby producing thermal convection in the melt so as to successively bring the whole melt to the free surface thereof, and
the steps of reducing the pressure immediately above the free surface of said melt and pumping away substantially all gases evolving from said melt.

2. A method for the degassing of melts comprising:
the step of directing a beam of charged particles having a predetermined cross sectional area on the free surface of a melt,
the step of scanning at least a part of the free surface of the melt with said beam at a scanning frequency not exceeding one cycle per second to thereby periodically heat and cool the surface and thus producing thermal convection in the melt so as to successively bring the whole belt to the free surface thereof, and
the steps of reducing the pressure immediately above the free surface of said melt and pumping away substantially all gases evolving from said melt.

3. A method as claimed in claim 2 where the scanning movement of said beam is rotational.

4. A method for the degassing of melts comprising:
the step of directing a beam of charged particles eccentrically on the surface of said melt,
the step of rotating the melt with respect to the beam at a frequency not exceeding one cycle per second whereby the surface of said melt is alternately heated and cooled producing thermal convection in said melt so as to successively bring the whole melt to the free surface thereof, and
the steps of reducing the pressure immediately above the surface of said melt and pumping away substantially all gases evolving from said melt.

5. A method for melting solid material and the degassing of the melt thereof comprising:
the step of directing a beam of electrically charged particles of predetermined intensity upon the solid material for a length of time sufficient to melt said solid material,
the step of pulsing said beam to create convective currents in said melt so as to successively bring the whole melt to the free surface of the melt, the intensity of said convective current varying as a function of the frequency of the pulses of said beam, and
the steps of reducing the pressure immediately above the free surface of said melt and pumping away substantially all gases evolving from said melt.

References Cited by the Examiner

UNITED STATES PATENTS

| | | | |
|---|---|---|---|
| 2,423,729 | 7/47 | Ruhleq | 75—49 |
| 2,880,483 | 4/59 | Hanks et al. | 22—57.2 |
| 2,989,614 | 6/61 | Steigerwald. | |
| 2,994,602 | 8/61 | Matsuda | 75—93 X |
| 3,005,859 | 10/61 | Candidus. | |
| 3,013,315 | 12/61 | Smith | 22—65 |
| 3,084,037 | 4/63 | Smith | 75—10 |
| 3,091,525 | 5/63 | Hunt | 75—93 |

DAVID L. RECK, *Primary Examiner.*

WINSTON A. DOUGLAS, *Examiner.*